United States Patent [19]
Winstead

[11] 3,789,095
[45] *Jan. 29, 1974

[54] CONTINUOUS METHOD OF MANUFACTURING ARTICLES FROM FOAMED THERMOPLASTIC MATERIAL

[76] Inventor: Thomas W. Winstead, 2 Overlook Ln., Baltimore, Md. 21210

[ * ] Notice: The portion of the term of this patent subsequent to June 13, 1989, has been disclaimed.

[22] Filed: Jan. 15, 1971

[21] Appl. No.: 106,861

Related U.S. Application Data

[60] Continuation-in-part of Ser. No. 798,821, Oct. 10, 1968, abandoned, which is a division of Ser. No. 480,917, Aug. 19, 1965, Pat. No. 3,479,694.

[52] U.S. Cl............... 264/51, 264/53, 264/210 R, 264/177 R, 264/321, 264/DIG. 5, 264/DIG. 13, 264/DIG. 16, 425/4 C, 425/224
[51] Int. Cl....... B29d 7/04, B29d 7/24, B29d 27/00
[58] Field of Search. 425/4 C; 425/224; 264/48, 51, 264/53, 321, 90, 37

[56] References Cited
UNITED STATES PATENTS

| | | | |
|---|---|---|---|
| 3,670,059 | 6/1972 | Winstead | 264/48 |
| 3,676,537 | 7/1972 | Winstead | 264/48 |
| 3,238,565 | 3/1966 | Jacobs | 264/321 X |
| 3,311,681 | 3/1967 | Cherney et al. | 264/48 |
| 2,902,718 | 9/1959 | Martelli et al. | 264/90 |
| 3,389,203 | 6/1968 | Merges et al. | 264/37 |
| 3,391,051 | 7/1968 | Ehrenfreund et al. | 264/48 X |
| 3,426,111 | 2/1969 | Simpson | 264/48 |
| 3,317,363 | 5/1967 | Weber | 264/321 X |

FOREIGN PATENTS OR APPLICATIONS 291,940   7/1965   Netherlands.......................... 264/51

Primary Examiner—Philip E. Anderson
Attorney, Agent, or Firm—Raphael Semmes

[57] ABSTRACT

An integrated method of continuously extruding low-density foamed thermoplastic material and manufacturing three-dimensionally formed articles therefrom. The method includes the steps of extruding and spreading a narrow strip of thermoplastic material at a high linear rate, vacuum forming articles therefrom on the periphery of a forming wheel (utilizing the heat of extrusion), severing the formed articles from the strip, packaging the articles, and returning the selvage for re-use.

12 Claims, 20 Drawing Figures

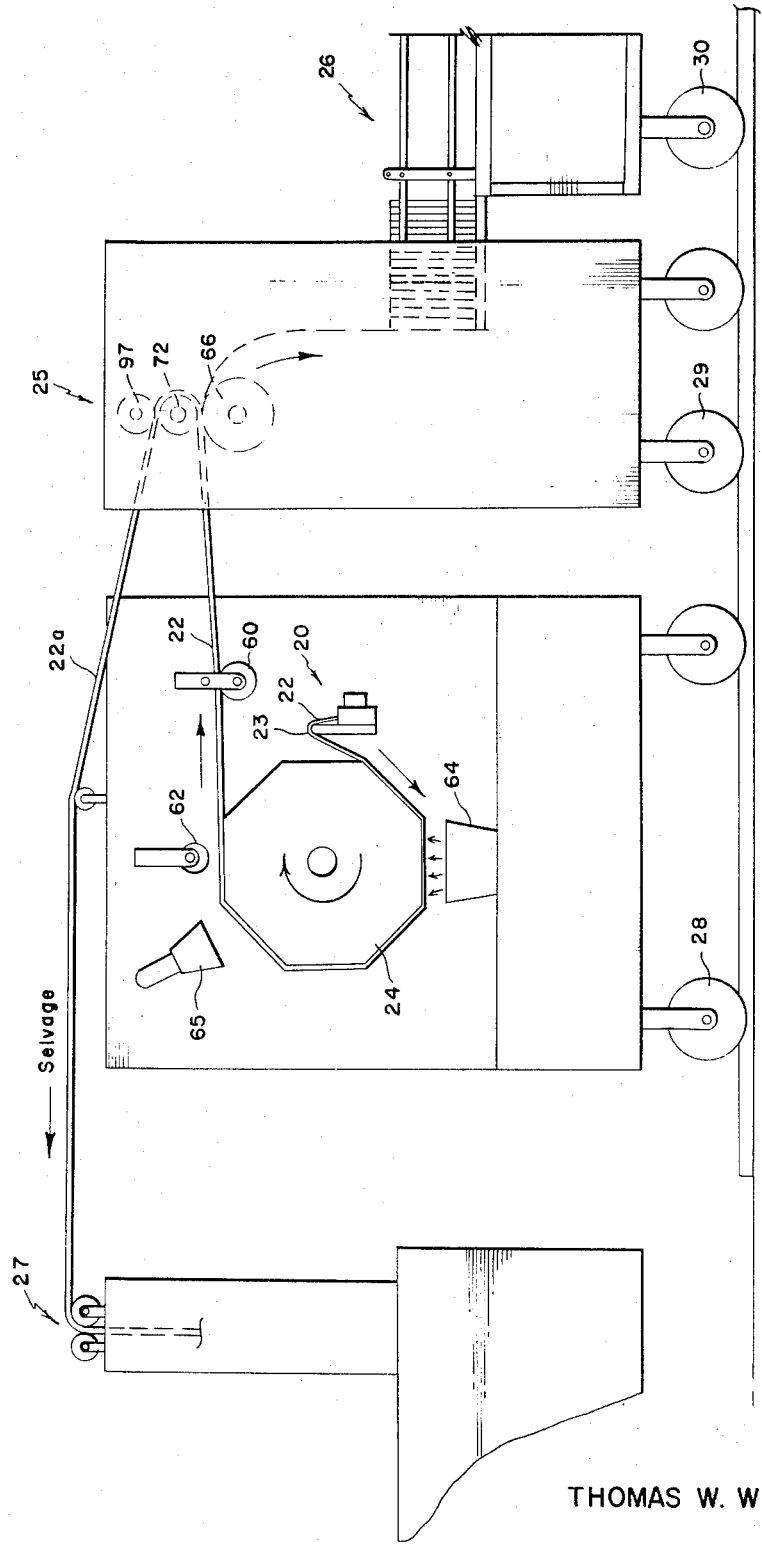

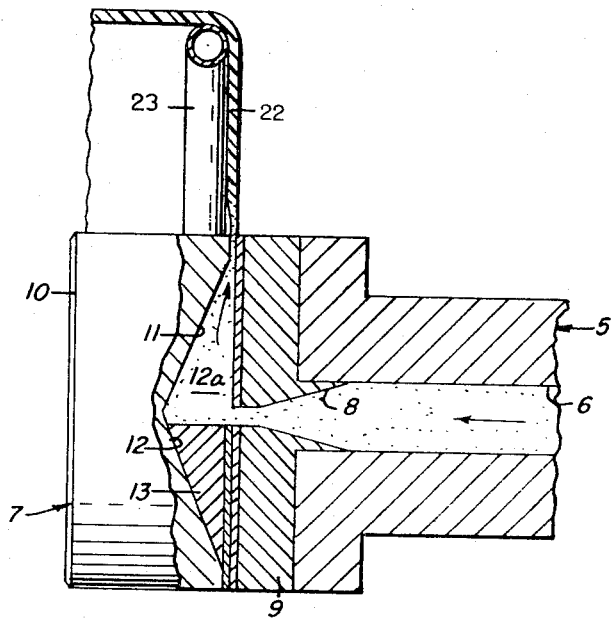
FIG. IA
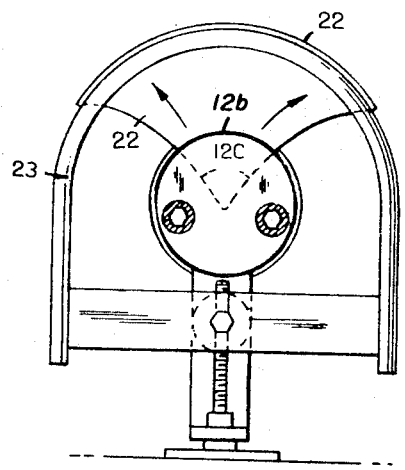
FIG. IB

INVENTOR
THOMAS W. WINSTEAD

BY Raphael Semmes

ATTORNEY

INVENTOR
THOMAS W. WINSTEAD

BY
ATTORNEY

INVENTOR
THOMAS W. WINSTEAD

BY  Raphael Semmes

ATTORNEY

INVENTOR
THOMAS W. WINSTEAD
BY Raphael Semmes
ATTORNEY

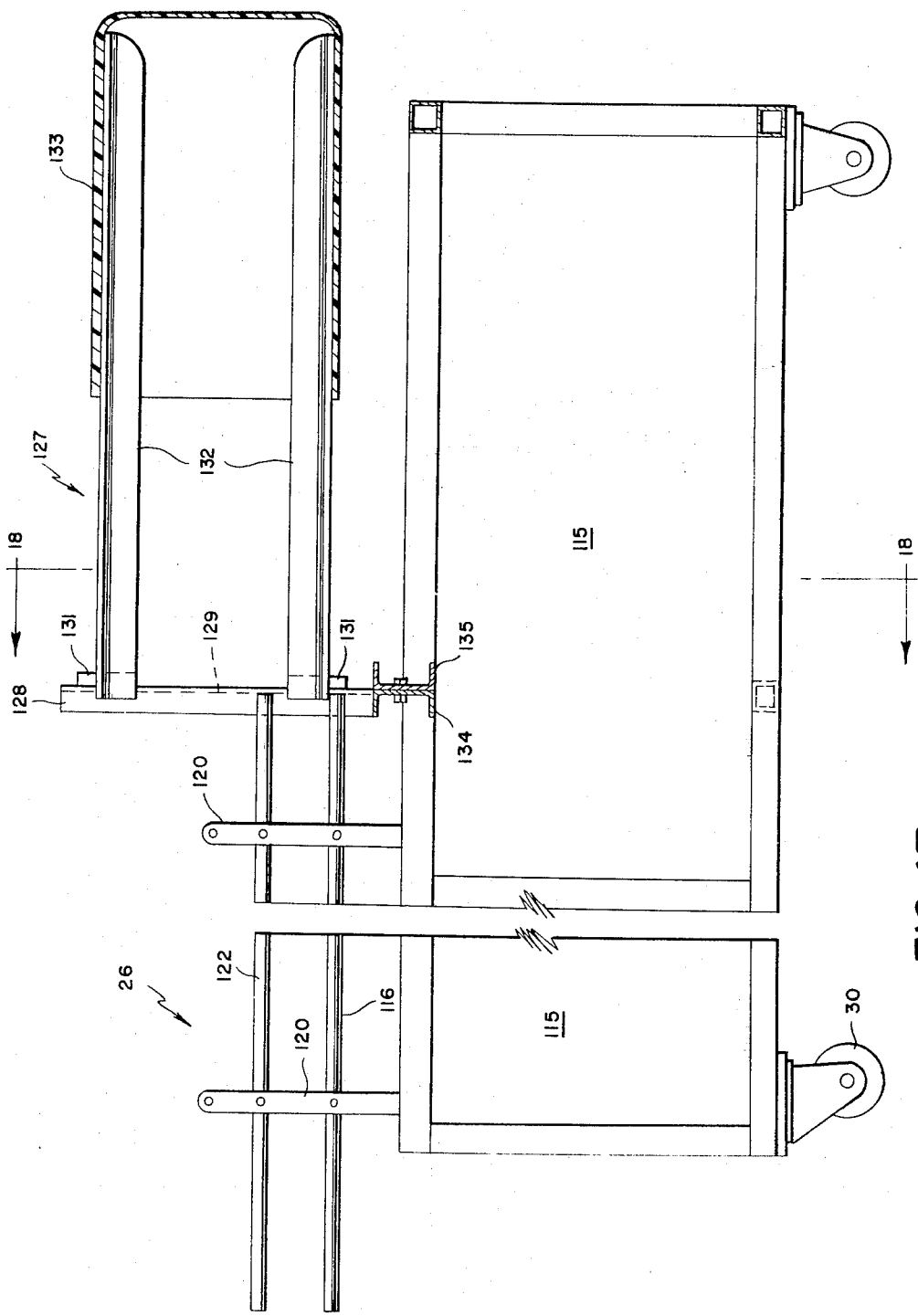

CONTINUOUS METHOD OF MANUFACTURING ARTICLES FROM FOAMED THERMOPLASTIC MATERIAL

REFERENCE TO CO-PENDING APPLICATIONS

This application is a continuation-in-part of Ser. No. 798,821, filed Oct. 10, 1968, and now abandoned which is a division of Ser. No. 480,917, filed Aug. 19, 1965 for "Continuous Method and Apparatus for Manufacturing Articles from Foamed Thermoplastic Material," now U.S. Pat. No. 3,479,694, granted Nov. 25, 1969. Reference is also made to co-pending application Ser. No. 475,734, filed July 29, 1965, now U.S. Pat. No. 3,387,328, granted June 11, 1968, and to application Ser. No. 882,866, filed Dec. 8, 1969, now U.S. Pat. No. 3,676,537 which is a continuation-in-part of application Ser. No. 508,417, filed Nov. 18, 1965 (now abandoned).

BACKGROUND OF THE INVENTION

This invention relates to a method of producing three-dimensionally formed articles of low-density foamed thermoplastic material on a continuous, integrated basis, and is more particularly concerned with the extrusion of the thermoplastic material and the production and packaging of the articles without interruption.

The present invention is concerned with the production of low-cost, three-dimensionally formed articles of thermoplastic material of low density. "Low density" as employed herein means a density of up to about three pounds per cubic foot. "Three-dimensionally formed articles" means articles molded individually to a depth of at least of the order three-eighths inch in orthogonal planes, e.g., trays or cups.

It has been the usual practice in making formed articles from foamed thermoplastics to employ a multiple stage method and apparatus. First, foamed sheeting is extruded and collected on rolls which are stored until ready for use in a sheet-forming machine, which reheats the material on a progressive basis and forms it in molds by the use of differential air pressure, plungers, or both. After forming, the web is transferred to a cutting machine which severs the formed articles from the selvage. The extrusion operation, the forming operation, and the cutting operation require entirely separate steps and machinery, and although this system has been satisfactory in certain respects, it has many limitations affecting cost, quality control and operational control.

For example, with the conventional multiple stage operation, the following disadvantages and limitations are noted:

1. Considerably more floor space is required for the multiple steps and machinery than is required for an integrated system.

2. Because of the usual "blown bubble" method used in producing the sheet, it is very difficult to produce low density material of good quality, and this naturally affects cost.

3. Because of the separation of the extrusion and fabricating operations, quality control becomes more difficult and costly; a considerable amount of sheeting may be made for subsequent forming with defects which are not detected until the forming operation is begun, at which time it is too late to take corrective measures. This naturally results in the rejection of large quantities of material.

4. Since foam sheeting has excellent thermal insulating properties, it is difficult and costly from an energy standpoint to heat it properly and uniformly during the fabrication step.

5. With certain types of thermoplastic foam sheeting, there is a period of aging during which volatiles used in the foaming process are evolved and replaced by air. Therefore, careful attention must be paid to the time when the re-heating takes place during the fabricating step, because the residual content of the volatile can have an appreciable effect on the final density of the product, necessitating operational controls which further complicate the process.

6. Because of the difficulties in obtaining uniform heat and because of the necessity of waiting until a large percentage of the volatiles has evolved from the material, it is not possible to form such foamed sheeting as readily or as deeply as would otherwise be the case.

7. A multiple stage process is always more difficult to automate and necessarily requires more manpower than an integrated process, which again affects costs adversely.

Continuous processes attempted heretofore for manufacturing foamed articles have not been capable of producing high-quality low-density articles economically, especially where vacuum forming is employed.

BRIEF DESCRIPTION OF THE INVENTION

It is accordingly a principal object of the invention to provide an improved method of producing articles of foamed thermoplastic material, particularly three-dimensionally formed articles of low density.

A more specific object of the invention is to provide a unique method of producing such articles economically on a continuous basis, in which the extruding, forming, cutting, and packaging operations take place without interruption and without the necessity of reheating the extruded material before forming, the individual steps of the method being coordinated so as to produce articles of high quality.

Briefly stated, in accordance with a preferred embodiment of the present invention, thermoplastic material, such as polystyrene resin stock, for example, heated to an appropriate temperature and mixed with a volatile blowing agent, is extruded so as to produce a flat, narrow-strip, low-density foamed extrudate at a high linear rate. The extrudate is spread laterally over a mandrel, from which it is immediately fed to rotating vacuum molding apparatus. The resultant three-dimensionally formed articles are stripped from their molds, severed from the foam web, stacked, and packaged without interruption, the selvage being reclaimed. Critical operating parameters permit deep-draw three-dimensional vacuum molding on a continuous basis without requiring reheating of the extrudate, without adversely affecting the density and cell structure of the foam, and without introducing wrinkles or other imperfections.

BRIEF DESCRIPTION OF THE DRAWINGS

The invention will be further described with reference to the accompanying drawings, which illustrate typical apparatus for performing the process of the invention, and wherein:

FIG. 1 is a schematic view illustrating an integrated system which may be employed in the method of the invention;

FIG. 1A is a longitudinal sectional view illustrating the extruder head and mandrel;

FIG. 1B is an end view showing the extrusion die and mandrel and illustrating an extruded sheet of foamed thermoplastic passing over the mandrel from the die lips;

FIG. 17 is a view of the same in side elevation; and

DETAILED DESCRIPTION OF THE INVENTION

Figure 2:
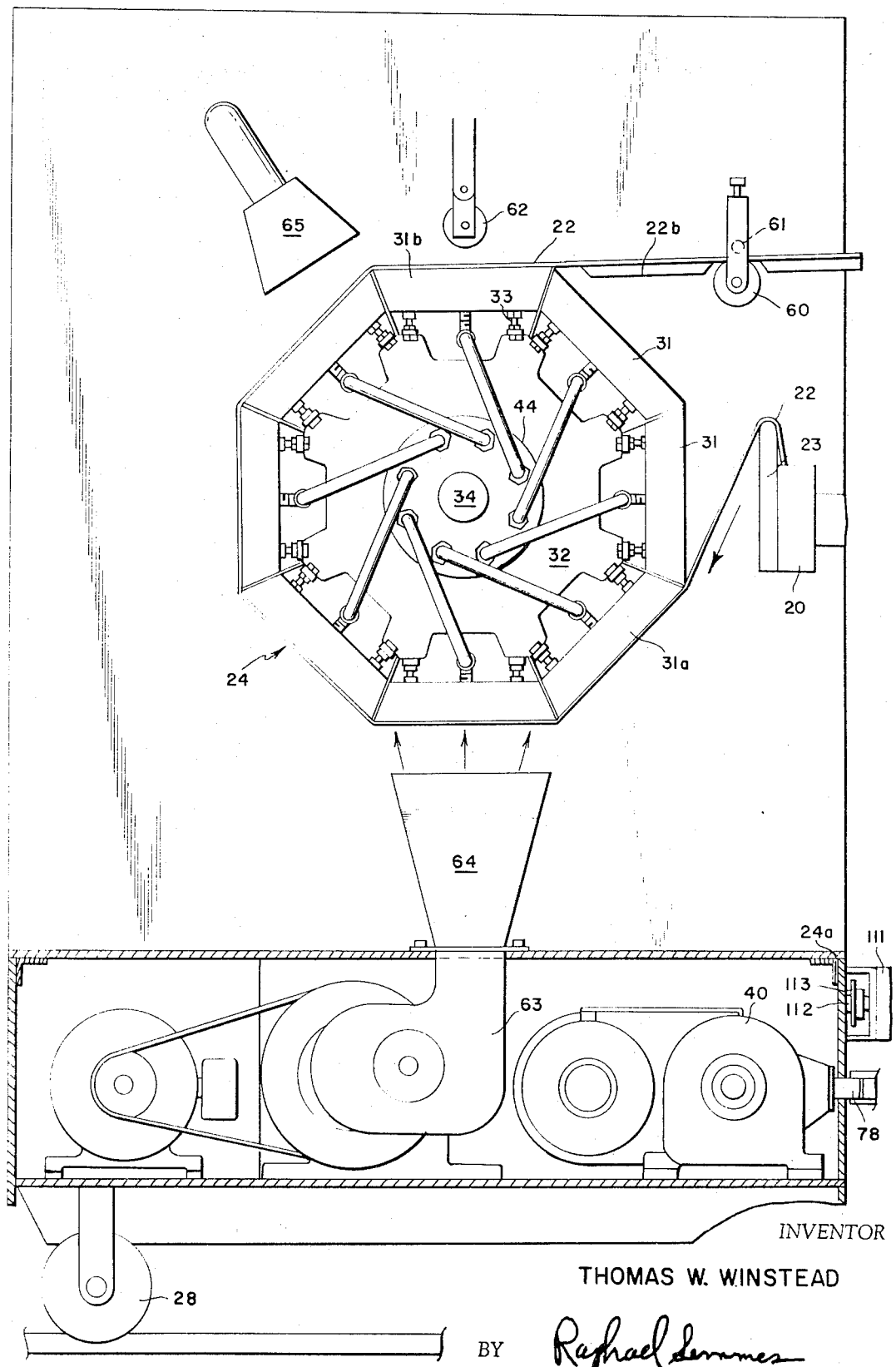
FIG. 2 is an elevational view partially in section illustrating the forming wheel unit.
Figure 3:
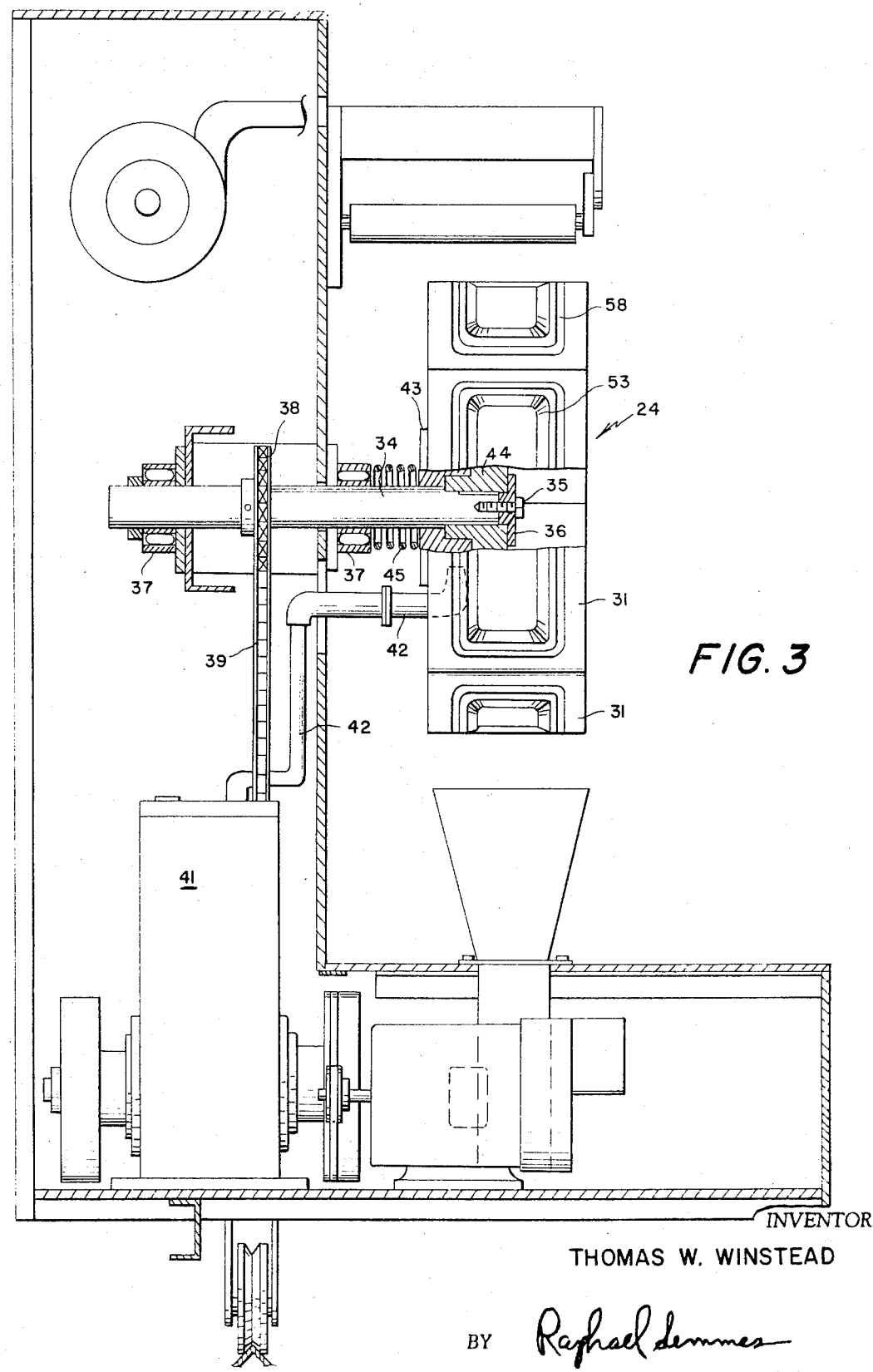
FIG. 3 is a plan view partially in section taken at right angles to the illustration in FIG. 2.

Referring first to FIG. 1, a preferred integrated system for performing the method of the invention includes an extrusion device generally indicated at 20, which is preferably of the type shown and described in my copending application Ser. No. 475,734, filed July 29, 1965, now U.S. Pat. No. 3,387,328, granted June 11, 1968. Here an expandible thermoplastic material incorporating suitable blowing agents is extruded through a die, forming a continuous narrow thermoplastic foam strip or sheet 22. The sheet 22 travels over a spreading yoke or mandrel 23, also shown in said copending Application Ser. No. 475,734, now U.S. Pat. No. 3,387,328, from which it is conducted around the periphery of a forming wheel 24 which vacuum forms the articles on the sheet 22.

By sequential valving, to be described, the vacuum is applied to the successive molds on the forming wheel 24 as the sheet 22 is tangent to the respective flat faces of the forming wheel and after the sheet has been flattened and stretched by the spreading yoke 23.

The formed articles, while still carried by the sheet 22, are then stripped tangentially from the upper side of the forming wheel, and the sheet and articles are conducted to the cutting unit 25 where the formed articles are removed from the sheet and directed to a stacking unit 26. The remaining selvage 22a is thereupon conducted to a granulating machine 27 which automatically divides it into fine particles, after which it is fed back into the extrusion equipment. In order to facilitate the sequential operation of the integrated units of the system and to insure proper spacing of said units, the forming wheel unit 24, the cutting unit 25 and the stacking unit 26 are mounted on suitable wheels or rollers 28, 29 and 30 respectively which may run on tracks, as shown.

The present invention employs low-density material, and as will be seen hereinafter, this requires the production and utilization of a narrow-strip, low-density extrudate at a high linear rate. If high quality articles are to be produced, the low-density extrudate must, first of all, be free of wrinkles and other defects. Such an extrudate can be produced as set forth in the aforesaid copending application Ser. No. 475,734, now U.S. Pat. No. 3,387,328, but not by conventional extrusion dies, such as the flat slit die. When foamed plastics are extruded from a die the extrudate immediately expands as it merges from the die lip. This expansion is three-dimensional and the amount of expansion depends fundamentally upon the resulting density. For example, if a resin is extruded which has an original density of 60 lbs. per cubic foot and by the addition of cells the density is reduced to 3 lbs. per cubic foot, the extrudate expands about 2.7 times in each dimension as it emerges from the die. Assuming for the moment that the expansion in thickness of the extrudate is of little concern (since the thickness dimension of the sheet is relatively small to begin with) and that longitudinal expansion is of little concern (since the rate at which the extrudate is taken off can readily be made 2.7 times the take-off speed which would prevail if the material were not expanding), there still remains the problem of the width dimension which increases 2.7 times. If the extrudate is 3 inches wide before expansion from the orifice of a flat slit die, the sheet after expansion is over 8 inches wide. At the center line of the die orifice, this is of no particular concern, inasmuch as the center line remains the center line as the material expands and is taken off. However, the edge of the extrudate must move rapidly from a point 1½ inches from the center line to a point over 4 inches from the center line. Since most of the expansion in a cellular material occurs very close to the die orifice, the geometry of suitable apparatus to cope with this width-wise expansion problem is critical. If this expansion is not properly accommodated, the extrudate will corrugate or wrinkle, particularly with low-density foam, resulting in poor quality or an unusable product. The conventional flat slit die fails to accommodate the width-wise expansion.

In tubular extrusion of foam sheet, the wrinkling or corrugation problem is controlled to some degree by the "bubble method." As the tube emerges from the circular die orifice, it is expanded by the internally trapped air or by an internal shoe which helps to remove the wrinkles or corrugations. However, this method has geometric limitations which preclude the extrusion and wrinkle-free spreading of low-density foam, and which preclude the collapsing or slitting of the tubular extrudate close enough to the die and soon enough to permit subsequent forming operations while the extrudate retains enough heat to be sufficiently pliable.

As set forth in the aforesaid co-pending application Ser. No. 882,866, and in the said co-pending Application Ser. No. 475,734, now U.S. Pat. No. 3,387,328, and as shown in FIGS. 1A and 1B, a suitable narrow-strip extrudate 22 can be produced at a high linear rate by a diverging die chamber which has a cylindrical outlet. A charge of molten thermoplastic raw material is fed under pressure to the central passageway 6 of the extruder body 5. The thermoplastic raw material may be a composition comprising polymers of ethylenically unsaturated monomers, such as polystyrene, polyethylene, polyvinyl chloride, or polypropylene, for example general purpose styrene containing 15 percent by weight of a non-inflammable volatile liquid blowing agent, such as trichlorofluoromethane (or pentane), and a suitable nucleating agent, such as 1 percent by weight of inorganic talc. The discharge end of the passageway or barrel 6 passes through an extruder head 7 and preferably terminates in communication with a converging inlet port 8 located centrally of a circular die plate 9. An end cap 10, also circular in shape, registers with the plate 9, being secured in place by any suitable means, and the inner face of the end cap is conically recessed, as at 11, providing, with the plate 9, a feed chamber 12 which is coaxial with the passageway 6 and converging opening 8. The conical front wall of the chamber terminates slightly inward of the periphery of the end cap 10 and is circumscribed by a narrow annular wall at the periphery. An adapter 13 conforms substantially to the surface contour of the chamber 12, with the exception that the upper portion thereof is provided with a V-shaped cut-out area, which, when the adapter is installed, provides the upwardly diverging radial confines 12c for the chamber 12a, thereby providing a substantially fan-shaped die reservoir, the upper portion of which terminates in the cylindrical lips 12b (see FIG. 1B). The outlet opening of the die is a circular arc in the plane of the flat extrudate, the arc-length of the die opening being chosen to produce a narrow-strip extrudate, which will be considered later in detail. Internally of the die, the material flow begins at a point which is equidistant from all points on the cylindrical die lips. This provides a uniform distribution of flow pressure at all points along the lips and thereby eliminates strains or distortions in the extrudate.

To ensure the controlled spreading of the extrudate after it leaves the die lips, a mandrel or spreader 23 is provided adjacent to the die lips. The mandrel preferably comprises a transversely arcuate tube (generally parallel to the die lips) which is supported in an upright position, so that as the extrudate leaves the die lips and expands, it moves radially outward to the mandrel, spreading laterally over the mandrel while being supported thereby, to provide maximum accommodation of the width-wise expansion of the extrudate.

In the space between the cylindrical die orifice and the mandrel, any corrugations or wrinkles which may tend to form in the expanding cellular strip are very efficiently and quickly removed. The mandrel is preferably hollow in order to provide for circulating coolant, and its surface may be coated with an anti-friction surface coating. The flow of material over the mandrel not only serves to prevent corrugations or wrinkles which would otherwise form upon expansion of the extrudate, but also, if proportioned properly and positioned properly, the mandrel can actually provide transverse stretch to the sheet as it is pulled longitudinally around the mandrel.

As the extruded strip passes over the mandrel, it may be drawn away at an oblique or acute angle with respect to the plane of the mandrel, as shown in FIG. 1. If the mandrel is concentric to the cylindrical die opening, nothing further is gained by drawing away the extrudate at more than a 90 degree angle to the plane of the mandrel. However, if the take-away angle is less than 90 degrees, becoming acute with respect to the plane of the mandrel or more nearly parallel to the mandrel plane, the shape of the mandrel may then be made other than concentric with the die opening, either by making it elliptical in shape, rather than circular, or by moving it closer to the die opening, which effectively does the same thing, In practice, the extruded strip may be drawn away from the mandrel in a direction almost opposite to the direction of the extrudate flow from the die opening to the mandrel. Although not absolutely essential to the process, the geometry of the direction of the extrusion (upward) and the reversal (downward) as the extrudate flows to the bottom of the forming wheel is considered quite advantageous. This permits maximum employment of the circumference of the forming wheel for cooling and setting the formed articles prior to their tangential stripping from the top of the forming wheel. If other geometry is used, one if faced with the loss of the greater portion of the circumference of the forming wheel for cooling, and/or a removal point which would not permit convenient location of the cutting apparatus and the maintenance of suitable tension between the two machines.

Although one might suppose that it would be best to extrude a fairly wide sheet, in order to have a web width which accommodates a large number of molding cavities, just the opposite is true in the process of the invention. If three-dimensional forming is to be carried out by utilization of the heat of extrusion (without reheating of the extrudate), this being essential in accordance with the invention, the extrudate must be produced as a narrow strip which is fed at a high feed rate to the molding apparatus. This is especially so if the articles are to be made by vacuum forming, where the material must have sufficient plasticity to permit deep draws with the low pressure available. As the extrudate emerges from the die, it expands rapidly, because the blowing agent, which previously has been in solution due to pressures in the system of perhaps 500 psi or more, is no longer under more than atmospheric pressure (approximately 15 psi), and at the lower pressure the blowing agent comes out of solution and volatilizes. This change of state naturally absorbs heat energy, thus rapidly lowering the temperature of the extrudate. The decrease of temperature is especially pronounced in low-density foam. In wide sheets fed at conventional slow speeds, the additional heat loss through radiation and convection becomes intolerable. A narrow web feb at high speed minimizes heat loss from the material and makes feasible the continuous process of the invention.

A high percentage of volatile blowing agents may be employed in extrudable foams, such as styrene, and such agents have a plasticizing effect on a polymer. The narrow-strip, high-linear-rate concept of the invention permits the forming step to take place immediately after extrusion and to benefit from the plasticizing effect of the volatile blowing agents. Moreover, when a narrow strip is used, as in the present invention, corrugations or wrinkles in the web can be overcome, as set forth above, by stretching the material to the greater arc length of the mandrel. With wide or tubular low-density extrudate, the problem of avoiding or removing such defects is insurmountable.

The high linear rate of feed is also an important factor in eliminating the possibility of crushing of the strip as it passes over the spreader or mandrel. A wider sheet, and its inherently slower feed rate, would make cell collapse a definite difficulty. However, in the method of the invention, the extruded material is still expanding as it reaches the mandrel, since its temperature is still well above the boiling point of the volatile blowing agents, and the cells are under appreciable internal pressure, making them resilient enough to resist crushing.

With the higher density foam generally employed in the prior art, heat loss due to volatilization is considerably less, and it is possible (although difficult) to re-heat the extrudate. The addition of heat from outside of the extrudate, which must pass through the outer portions in order to reach inner portions, is extremely difficult and impractical with low-density foam, because of the exceptional thermal insulating characteristics of the foam itself. Since heat transfer is so poor in low-density foams, time and distance factors become critical. Furthermore, because of the poor heat transfer characteristics of low-density foam, an uneven temperature profile is developed across the web thickness during re-heating, which results in poor forming or stress in the finished product. Unevenness of temperature profile is aggravated if an effort is made to decrease time of heating by increasing the intensity of heat, and uniformity is sacrificed.

It might be assumed that stock temperatures coming from the extrusion die could be increased in order to compensate for the loss of heat. However, with foamed materials there is a limit beyond which the stock temperature cannot be increased without causing cell collapse and/or brittleness. For example, with styrene this limit is of the order of 300°F. in the die chamber. The narrow-strip, high-feed-rate concept of the invention is the solution to the problem.

To summarize, the narrow-strip, high-feed-rate concept of the invention minimizes wrinkles or corrugations in the material as the material expands from the die orifice; it minimizes the loss of heat content, which is inherently so rapid in an expanding low-density foam extrudate; it minimizes the loss of volatiles, which have benefical plasticizing effects; and it maximizes the capability of making low-density, deep-drawn articles of high quality of low cost.

In accordance with the invention, the width of the strip is optimally within the range of from less than 1 to a maximum of 18 inches wide after expansion, and the thickness is optimally between 0.020 and 0.300 inch after expansion. A typical temperature profile beginning with the stock in the die is shown in the following table:

TABLE I

| | |
|---|---|
| Die stock temperature | 300°F |
| ½" from die lip | 280°F |
| At mandrel | 270°F |
| At initial forming station | 230°F |
| 90° around forming wheel perimeter | 180°F |

Compared to prior art extrusion-forming methods, the feed rate of the extrudate produced by the invention is very high. Assuming a density of 2.5 pounds per cubic foot and a final thickness of the extrudate of 0.125 inch, for example, the following linear extrudate feed rates are typical for the stated widths and pounds per hour of extrudate produced:

TABLE II

| | 100 lb. per hr. | 200 lb. per hr. | 300 lb. per hr. |
|---|---|---|---|
| 6" width | 128 ft. per min. | 256 ft. per min. | 384 ft. per min. |
| 12" width | 64 ft. per min. | 128 ft. per min. | 192 ft. per min. |

The minimum feed rate is of the order of 40 feet per minute. The size of disposable and packaging products which are produced by the invention dictates that for 90 percent of all production, extrudate widths will be from 6 inches to 12 inches. The following table gives typical operating conditions:

TABLE III

| Material | General Purpose Styrene | General Purpose Styrene |
|---|---|---|
| Output (lb. per hr.) | 125 | 150 |
| Blowing agent (%) | 14 | 14 |
| Nucleating agent | 1% talc | 1% talc |
| Stock temp. of die (°F) | 295 | 295 |
| Extrudate temp. at spreader (°F) | 230 | 240 |
| Extrudate temp. at first forming station (°F) | 200 | 215 |
| Web width (inches) | 11.2 | 8.2 |
| Web thickness (inches) | 0.150 | 0.150 |
| Foam density (lb. per cu. ft.) | 2.4–2.7 | 2.4–2.7 |

In a typical system for carrying out the method of the invention, the mandrel is located between 2 and 3 inches away from the die lip, and the near edge of the mold at which forming is commenced is about 6 inches from the mandrel along the path of the extrudate.

As seen in FIGS. 2 – 5, the forming wheel 24 comprises a series of flat, peripherally mounted molds 31, which, in the embodiment illustrated, jointly form a wheel of octagonal periphery. These molds are supported on a wheel disc 32 by suitable screw-threaded fixtures 33 (FIGS. 4 and 5) engaging cross bars 33a, fixed to the outer edge of disc 32. By means of these fixtures, the individual molds may also be radially adjusted on the disc for proper positioning relative to one another. The disc 32 is keyed to a rotatable shaft 34 so as to rotate therewith and is held in place on the shaft by a bolt 35 and plate 36.

The shaft 34 is mounted in cantilever (FIG. 3) and rotatably supported by bearings 37 and is driven by a sprocket 38 and chain 39 from a drive sprocket (not shown) mounted on a motor drive unit 40. This motor drive unit is a variable speed unit of conventional type with suitable control for varying the speed of the forming wheel 24.

Figure 5:
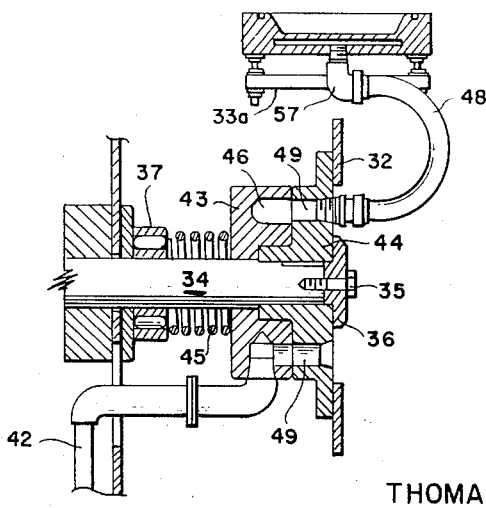
FIG. 5 is a sectional view taken on line 5—5 of FIG. 4, illustrating the mold structure.
Figures 9, 10:
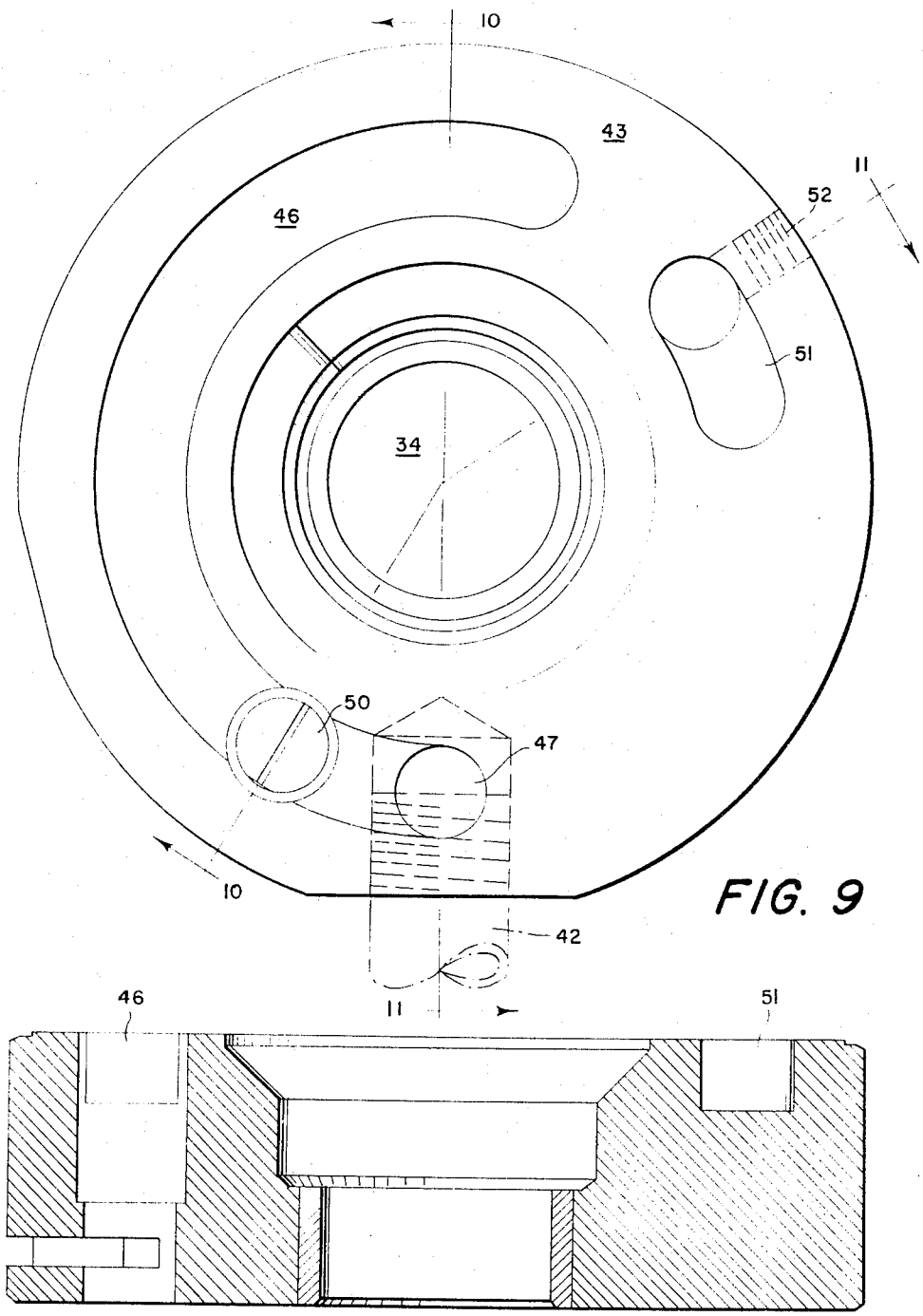
FIG. 9 is a plan view of the vacuum control manifold valve plate.
FIG. 10 is a sectional view taken on line 10—10 of FIG. 9.

The vacuum forming system for the wheel 24 comprises a vacuum pump 41 which creates suction in the connecting pipe or hose 42, connected to the manifold plate 43, shown in detail in FIGS. 9 and 10 and hereinafter referred to. As seen in FIG. 5, the manifold plate 43 is held in intimate contact with the hub 44 of the forming wheel 24 by a spring 45 interposed between the inner bearing 37 and the outer face of the manifold plate and forces the latter against the forming wheel hub 44.

Figure 4:
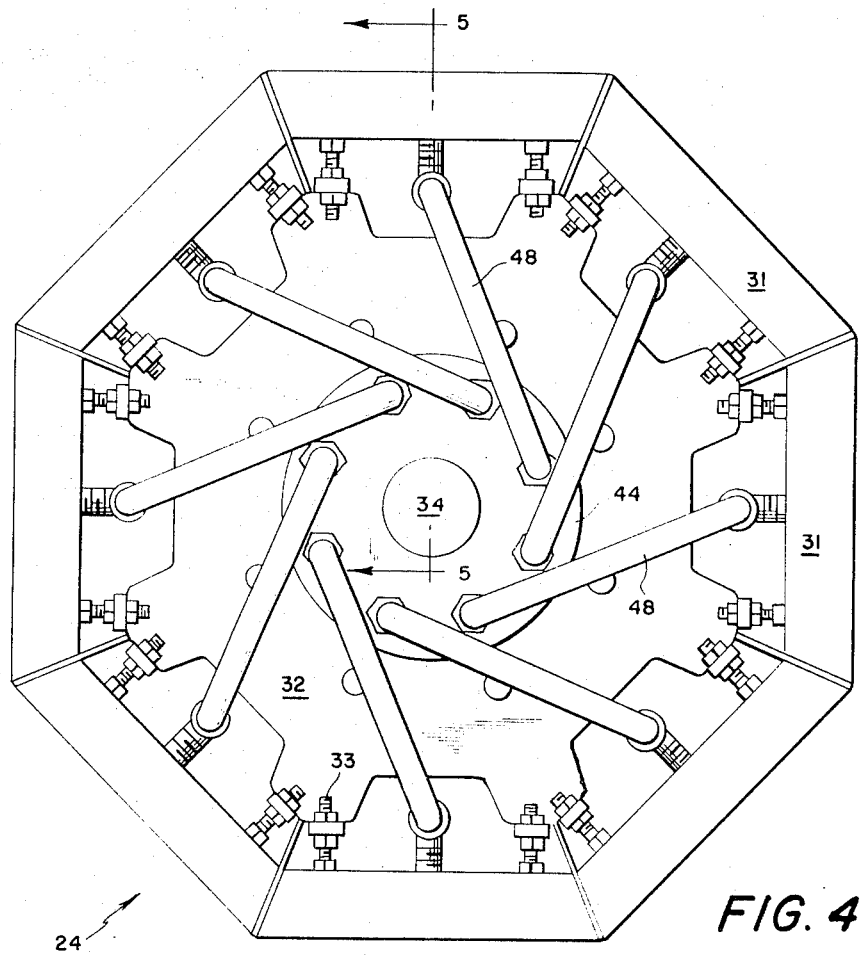
FIG. 4 is an enlarged side elevation of the forming wheel.

The manifold plate 43 is, of course, held stationary by tube 42 while the hub 44 rotates with the shaft 34. As seen in FIG. 9, the manifold plate 43 is provided with a relatively long, arcuate slot 46, one end of which communicates with the suction pipe 42 as at 47. As shown in FIGS. 4 and 5, each of the vacuum molds 31 on the periphery of the wheel 24 is connected by a pipe 48 to a corresponding port 49 in the hub 44. Thus, as the hub rotates, each port 49 sequentially comes to a position on the manifold plate where the arcuate slot 46 begins to cover the port, thus creating a vacuum within the mold cavity. As the hub and wheel continue to rotate, the slot 46 maintains the vacuum with a number of successive molds on the wheel over a large percentage of a full revolution, and when the end of the slot is reached, the vacuum is cut off.

Preferably, a valve 50 leading to one end of the slot 46 is employed to permit the maintenance of a good vacuum on start-up. This valve is maintained in closed position until sufficient vacuum has been established, whereupon it is opened as initial vacuum is established in all of the molds communicating with the slot 46.

Figure 6:
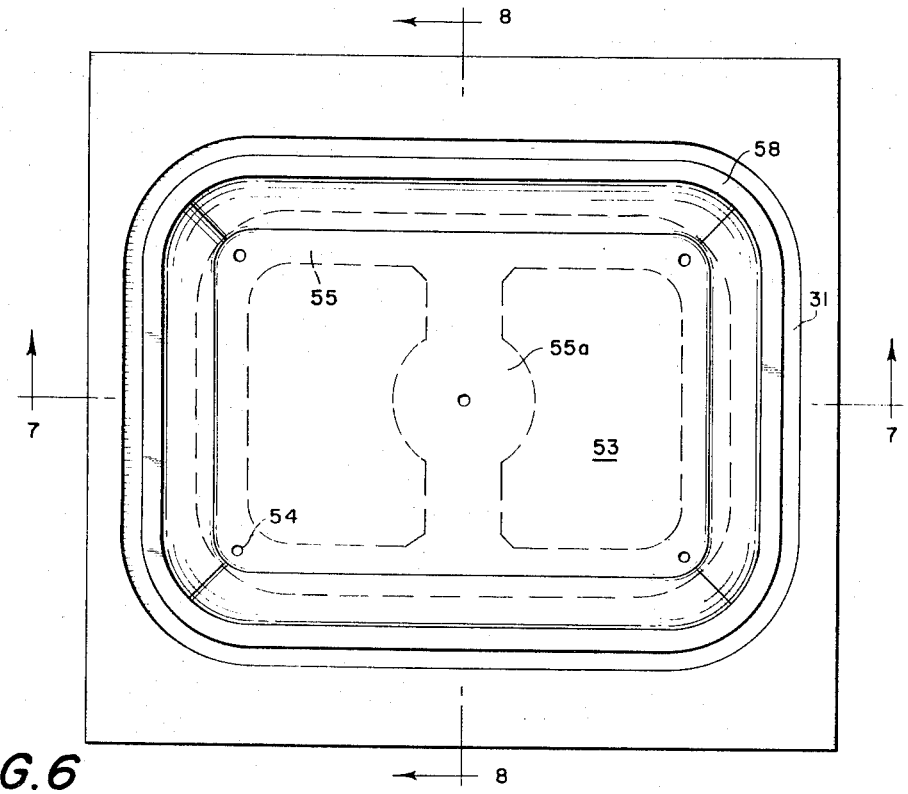
FIG. 6 is a further enlarged plan view of a mold.
Figure 7:
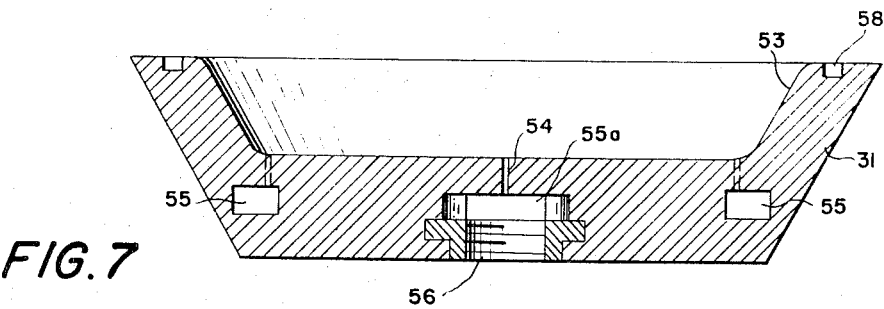
FIG. 7 is a sectional view taken on line 7—7 of FIG. 6.
Figure 8:
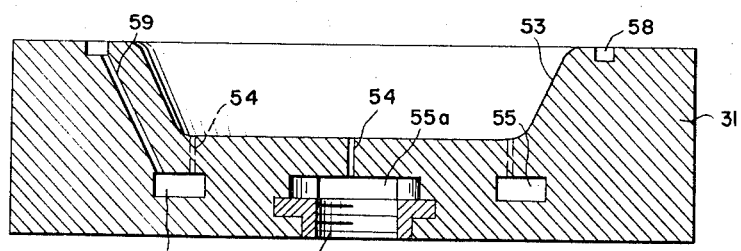
FIG. 8 is a similar view taken on line 8—8 of FIG. 6.

A second, shorter arcuate slot 51 is connected to an air source at 52 which, in proper sequence, communicates with each mold cavity and thereby ejects the finished product from the cavity, as will appear. appear The molds 31 are identical, and a description of one will suffice for all. As seen in FIGS. 5 – 8, each mold is provided with a suitably shaped mold cavity 53 communicating through appropriately spaced vacuum ports 54 with a vacuum chamber 55 formed in the body of the mold. As best seen in FIG. 6, the vacuum chamber 55 is in the form of an endless channel extending around the bottom wall of the mold and connected crosswise by a central channel 55a, thus equally distributing the vacuum created in the chamber. The cross channel 55a is provided with a threaded insert 56 by means of which it is operatively connected to a coupling 57 carried on the end of the respective vacuum hose 48. Preferably, the insert 56 is cast in the mold during its forming.

In order to hold and seal the thermoplastic sheet around the entire periphery of the cavity 53 during the forming operation, a vacuum groove 58 is provided in the top surface of the upper edge of the mold wall. This channel communicates with the vacuum chamber 55 by a passageway 59. This sealing operation may be effected prior to or simultaneous with the application of vacuum to the main mold cavity 53 by means of the vacuum pump 41 so that the vacuum groove is first evacuated and clamps the edges of the sheet completely around the cavity, holding them firmly during the subsequent drawing of material into the cavity itself. The sequencing of these two steps may be accomplished in one of several ways. It is most easily accomplished by relatively restricting flow from the cavity while maximizing flow from the vacuum groove 58 itself. This precludes the need for complicated channeling and valving. However, the clamping groove and the cavity may actually be segregated from one another and separately valved in sequence. It may also be noted that the vacuum groove 58 may be a continuous groove or it may comprise a series of suitably spaced vacuum grooves extending around the upper edge of the mold 31.

As previously indicated, the maniforld plate 43 is provided with a short arcuate slot 51 connected to an air source at 52. This slot 51 communicates with each mold cavity through vacuum chamber 55 in proper sequence as the hub 44 rotates relative to the manifold plate and thereby ejects the finished product from the cavity at the proper time.

The complete cycle of the forming operation is best illustrated in FIGS. 1 and 2 where it will be seen that the sheet of foamed thermoplastic 22 is extruded from the die 20, in the manner set forth in detail in the description above, and after expanding passes over the spreading yoke 23, from which it is directed downwardly, and tangentially engages the mold 31a across its cavity opening as the wheel 24 rotates. Here it is immediately sealed around the edges of the cavity by the vacuum groove 58. At this point, vacuum has been admitted to the arcuate slot 46 in the manifold plate 43 which continuously applies vacuum to the mold cavities as they sequentially come into registry with the arcuate slot. By the time the mold 31a has reached the point 31b at the upper end of the wheel, the vacuum has been cut off from the mold cavity and air pressure is applied from slot 51 to eject the formed article from the mold cavity.

The continuous web 22 with the formed articles 22b still engaged is tangentially stripped from the forming wheel and guided by a pair of spaced edge-engaging rollers 60 and a backing roller 61 to the cutting operation to be later described. In instances where the foamed sheet 22 is relatively stiff or thick, it is preferable to employ a crimping roller 62. This crimping roller is positioned transversely of the periphery of the forming wheel 24 and spaced upwardly therefrom so that it only engages the sheet 22 at the junctions of the respective flat molds 31. This is accomplished at the top of the wheel just as the material leaves the mold 31b and provides a hinge point across the strip which precludes deformation of the articles 22b or the edges around the articles as the web is pulled straight and tangentially from the wheel. As before indicated, some thermoplastic forms require this treatment, while others do not.

While the illustrated embodiment of the invention employs a solid shaft 34, this shaft may be hollow in order that water may be brought to the mold wheel through the appropriate rotary joints and then to the individual molds whenever water cooling is required. When foamed materials are being produced, water cooling is not particularly useful because of the poor heat transfer characteristics of low density foams and poor conductivity of such materials to the water cooled molds. Therefore, the present invention contemplates the use of air cooling by means of an air blower 63 which directs air as at 64 to the lower portion of the wheel periphery, and, if desired, it may be suitably conducted to a point adjacent the upper portion of the wheel, as at 65.

Figure 12:
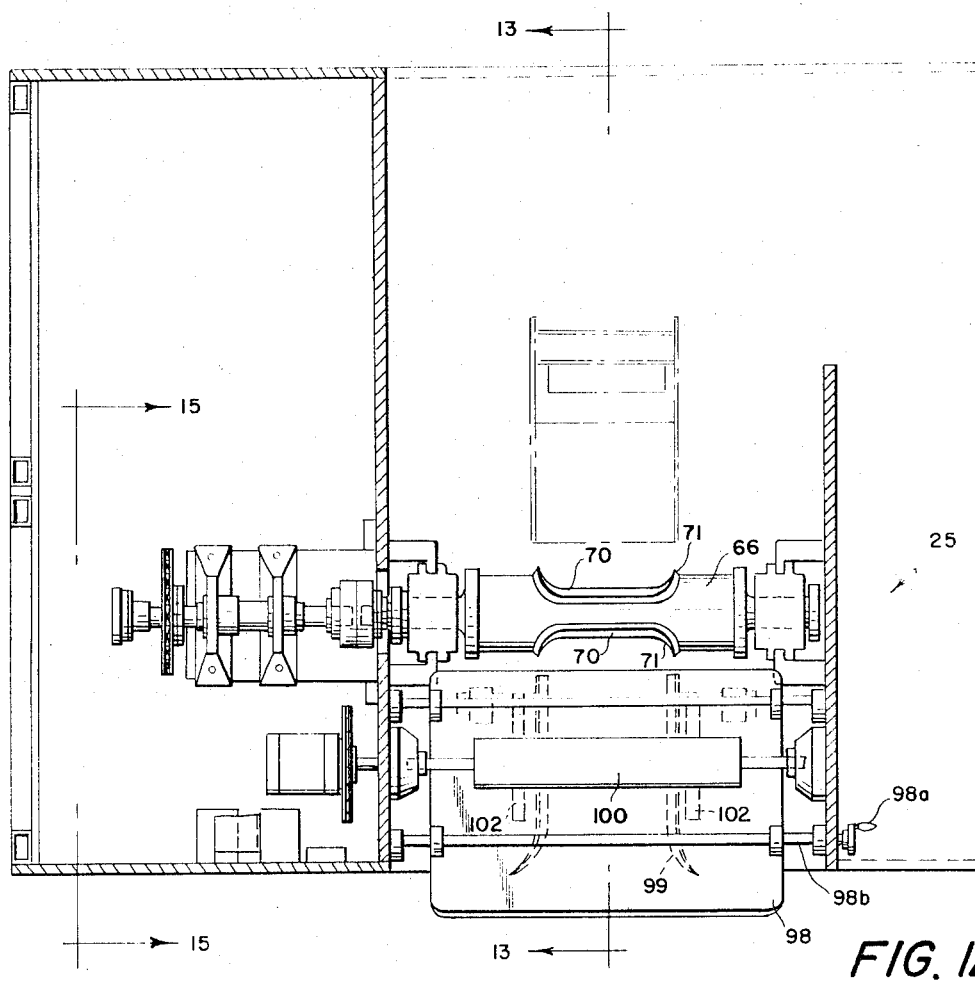
FIG. 12 is a top plan view of the article cutting unit.
Figure 11:
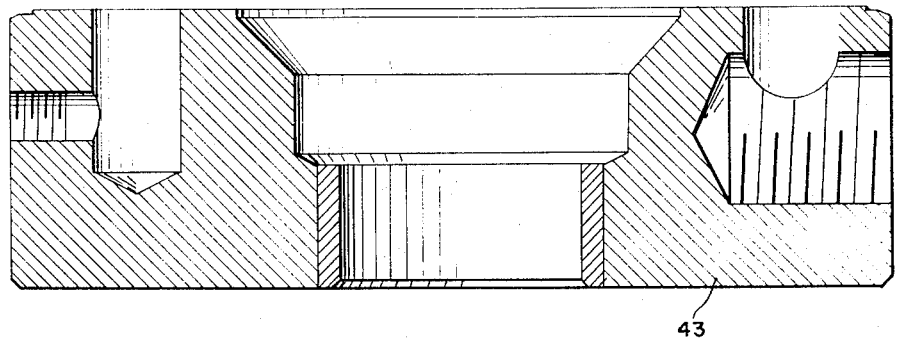
FIG. 11 is a sectional view taken on line 11—11 of FIG. 9.
Figure 13:
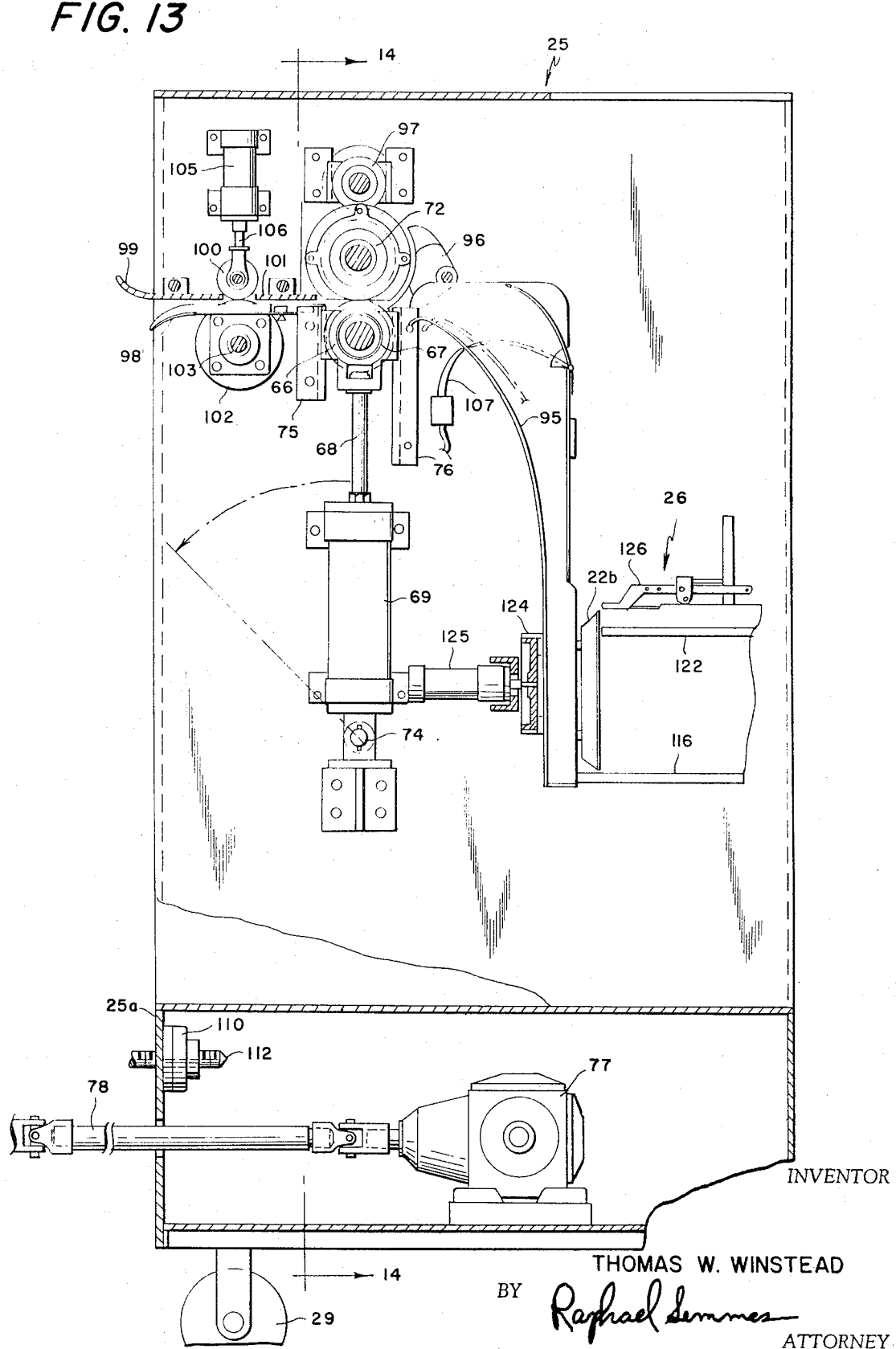
FIG. 13 is a sectional view taken on line 13—13 of FIG. 12.
Figure 14:
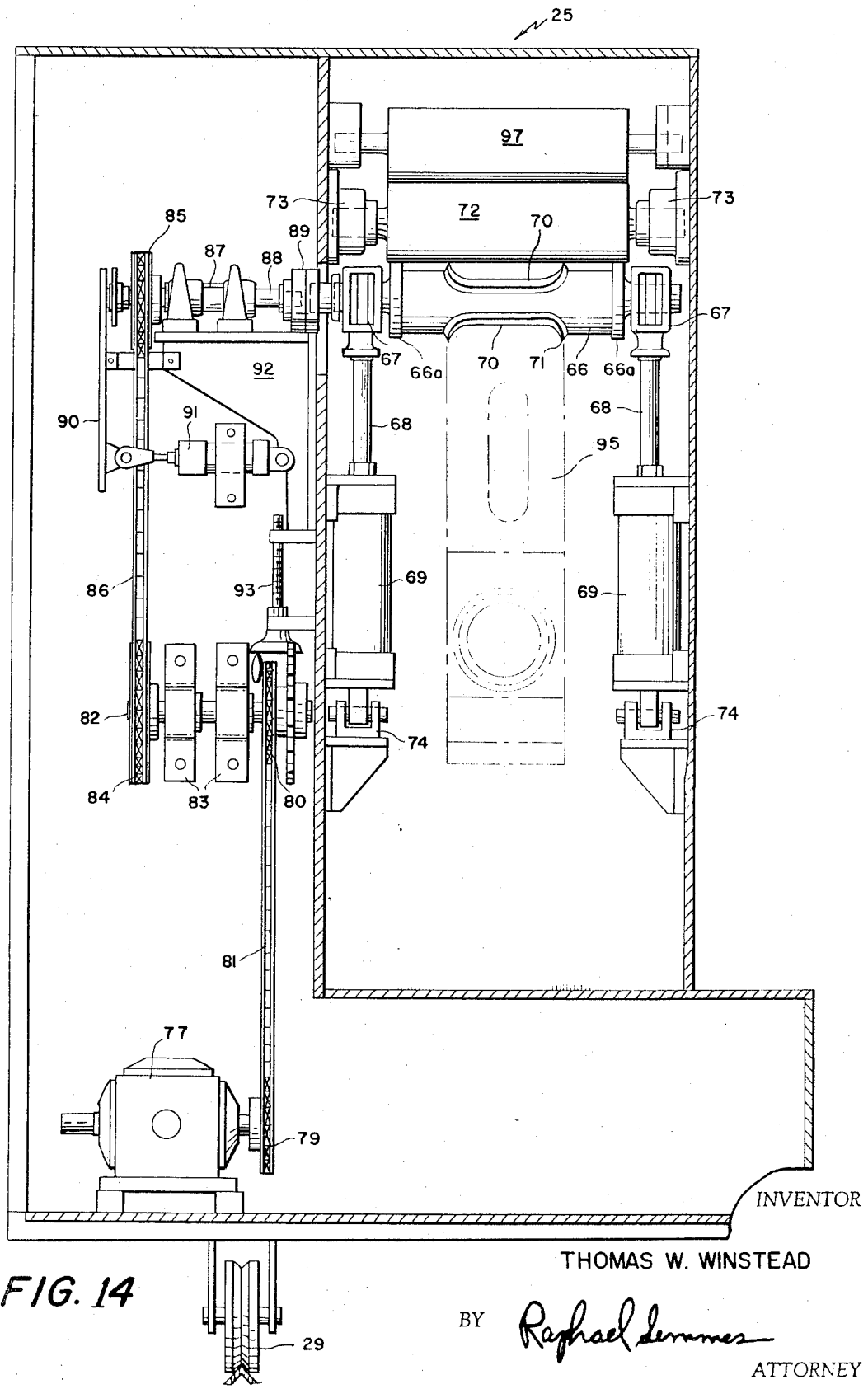
FIG. 14 is a sectional view taken on line 14—14 of FIG. 13.

Referring now to the cutting unit 25, shown in FIGS. 12 to 15, a horizontally disposed cutter roll 66 is rotatably supported at opposite ends by bearings 67 carried at the upper extremities of a pair of plunger rods 68 extending from air actuated plungers in cylinders 69. Thus, as will later appear, cutting pressure may be varied by increasing or decreasing the air pressure operating the cylinders 69. As best seen in FIGS. 12 and 14, the cutting roll 66 is provided with two radially opposed cavities 70 which are bounded by raised cutting knives 71. The cavities and cutting knives are contoured to conform to the contours of the articles which have been formed in the thermoplastic sheet 22 so that as the sheet advances between the cutting roll 66 and a backup or anvil roll 72 journalled in bearings 73, the knives 71 sever the formed articles from the selvage with the exact profile defined by the molds. As hereinafter explained, the rotation of the cutting roll 66 and the relative peripheral locations of the two sets of cutting knives are coordinated with the rotation of the forming wheel 24 so as to insure precise registry of the formed articles in the advancing sheet 22 with the cutting knives.

Figure 15:
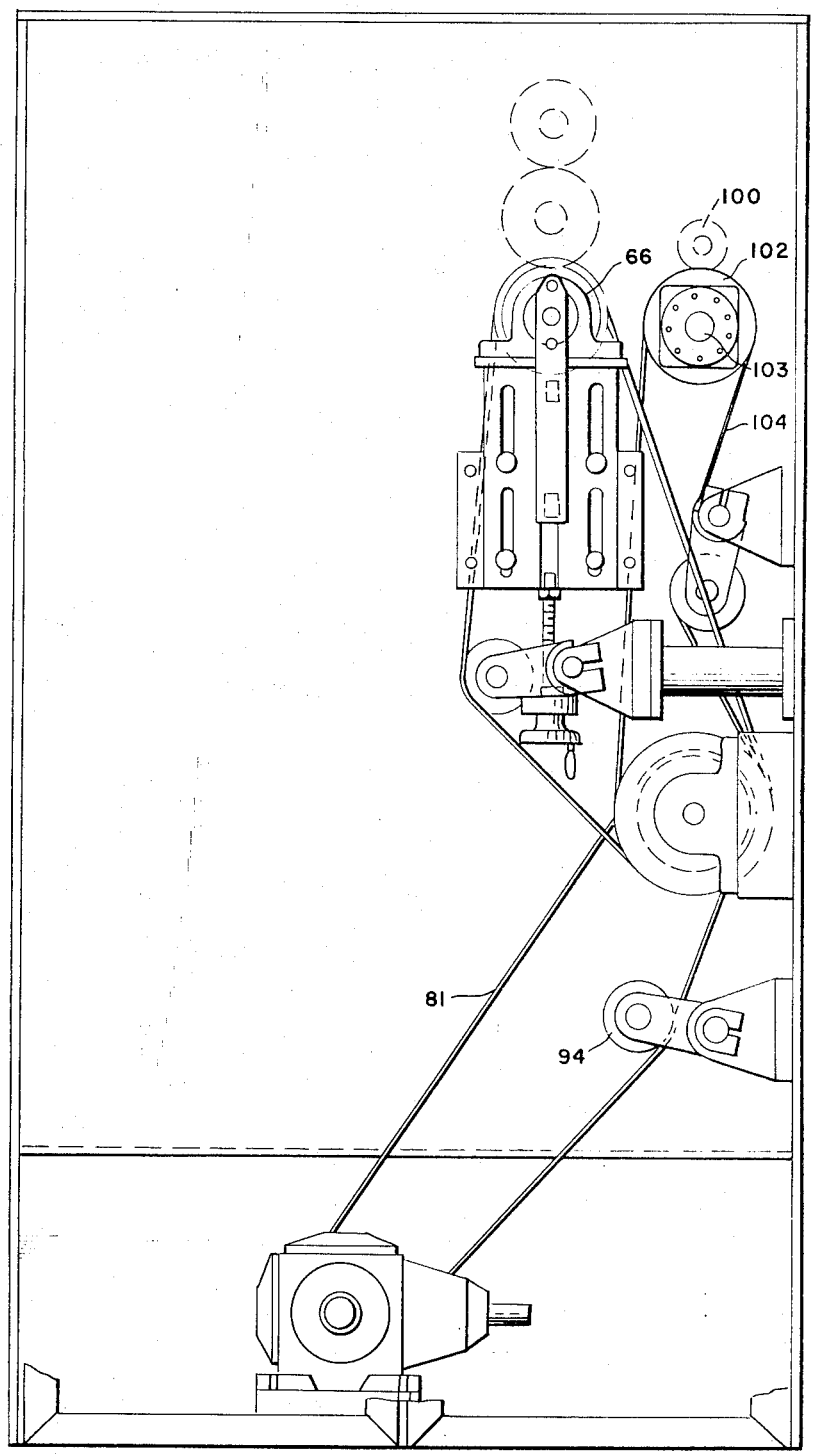
FIG. 15 is a sectional view taken on line 15—15 of FIG. 12.

The cylinders 69 are supported at their lower ends by pivotal connections 74, whereby the entire cutter roll assembly may be swung forward for rapid change of cutter roll sizes. To facilitate this operation, the bearings 67 are supported for vertical sliding movement by a pair of guide rails 75 and 76, as seen in FIG. 13. The forward guide rail 75 is shorter than the rear guide rail 76 so that when the pistons on rods 68 are drawn to the bottoms of the cylinders 69, the bearings 67 and the cutting roll 66 supported thereby can clear the guideways at the bottom of the short guideway 75 when the assembly is swung outwardly. The drive means for the cutting assembly comprises a mitered gear box 77 which, as seen in FIGS. 13 and 14, is driven by the forming wheel motor 40 through a universal telescoping shaft 78. A sprocket 79, driven by the gear box 77, rotates a sprocket 80 through sprocket chain or belt 81. The sprocket 80 is mounted at the inner end of a shaft 82, journalled in bearings 83, said shaft 82 carrying a second sprocket 84 at its outer end which is operatively connected to a sprocket 85 by a chain 86. This latter sprocket 85 drives splined shaft 87 which, in turn, drives an internal shaft 88 connected to a coupling 89. The coupling and internal shaft 88 may be moved in and out of engagement with the cutter roll 66 by means of the lever 90 which is actuated by an air cylinder 91. The entire assembly just described is mounted on a bracket 92 which may be moved vertically up or down by the handle and threaded stud 93, thereby bringing the position of the coupling 89 into line with the center of the shaft of the cutter roll 66. This permits accommodation of various sizes of cutter rolls, all of which may be driven even though their vertical center line may be at different positions. The chain 81 which connects sprocket 79 to sprocket 80 may be kept in tension by an idler 94 (FIG. 15).

As previously pointed out, the forming unit 24 and the cutting unit 25 are mounted on rollers 28 and 29 respectively, and by employing a telescoping shaft at 78, these units can be moved toward or away from one another, depending upon the timing desired.

In order to link the forming unit 24 and the cutting unit 25 together and maintain the proper spacing of the two during operation through the adjustable telescoping shaft 78, adjustable means are provided to connect the two housings of these units. As will be seen from FIGS. 2 and 13, the housing 25a of the cutting unit is provided with a pair of laterally spaced, threaded blocks 110, and, similarly, the housing 24a of the forming unit is provided with two laterally spaced, threaded blocks 111. Extending between respective pairs of blocks are threaded shafts 112, and adjacent each of the forming unit blocks 111 these shafts are provided with sprockets 113 over which a sprocket chain (not shown) is passed. Thus, the two threaded shafts 112 may be rotated together in the same direction to maintain the selected spacing adjustment of the two units. Although not shown in the drawing, a suitable hand wheel may be provided for rotating either one or the other of these connecting shafts and simultaneously rotating the other.

The formed articles 22a which are severed from the selvage after passing between the cutting roll 66 and backup roll 72 ejected down a chute 95 and into stacking position in the stacking unit 26. The selvage from which the articles have been severed is fed by threading fingers 96, upwardly between a stripping roll 97 and the periphery of the backup roll 72 and is conducted as seen in FIG. 1 to the granulating machine 27.

To facilitate the feeding of the strip of formed articles into the cutting roll, a plate 99, associated with guide fingers 98, is provided over which the advancing strip passes. A roll 100 extends transversely across the plate 98 which is provided with an intermediate slot 101 to accommodate the periphery of the roll 100. Beneath the roll 100 two wheels 102 are carried by a shaft 103 and driven by a chain 104. These wheels operate against the roll 100, which in turn is maintained under pressure against the wheels by cylinders 105 having piston rods 106 which rotatably support the shaft of roller 100. The shaft 103 carrying the wheels is driven by an air operated slip clutch, and torque control is provided by varying the air pressure operating the slip clutch through a regulator. The surface speed of the wheels is designed to be greater than the surface speed of the cutter and backup rolls which provides a means for feeding the strip of formed articles by gripping the selvage at each edge between the roller and wheels.

When the articles are discharged from between the cutting roll and backup roll, air jets 107 (FIG. 13) may be employed to transfer the articles down a chute 95. It has been found in practice that an air jet blown across the bottom edge of a flat article, such as a tray, decreases pressure on the underside of the tray and causes it to rapidly make the transition from horizontal to vertical and descend down the chute into stacking position.

As previously stated, the forming and cutting units are mounted symmetrically on rails and wheels so that they may be moved into appropriate operating positions. The forming wheel and cutting device are linked together by the adjustable linkage system previously described, which permits proper cutting registration of the formed articles in one dimension. Registration for the other dimension is controlled by the plate 98 and the guide fingers 99 thereon, this assembly being movable from side to side by hand wheel 98a and adjusting shaft 98b, as seen in FIG. 12. The handle 98a turns the suitably threaded shaft 98b which threadedly engages the plate assembly 98.

It should be pointed out that the surface speed of the cutting roll 66 should be slightly faster than that of the forming wheel 24, thus providing a uniform and constant tension at all times. Since the forming wheel is a polygon rather than a cylinder, the relationship of its perimeter to the cutting roll must be taken into consideration. For example, a mold or forming wheel with eight cavities and a cutting roll with two cavities must be run on a four-to-one ratio basis. This relationship of revolutions must be exactly and precisely provided for by suitable gearing betweeen the two machines. Nevertheless, the total perimeter length of the forming wheel must be somewhat shorter than four times the circumference of the cutting roll. Also, the thickness of the material must be taken into consideration and provided for in this relationship. With these perimeters properly calculated, suitable tension is maintained at all times, regardless of the relative position between the two units.

Returning to the cutting roll and referring to FIG. 14, it was previously pointed out that the knife edges 71 of the cutting roll are held firmly against the backup roll 72, and it should be additionally noted that excessive wear on the backup roll is prevented by longitudinally spaced bearings rings 66a at each end of the cutting roll. In other words, the main pressure between the cutting roll knife edge and the periphery of the backup roll is borne by the periphery engagement of the bearings 66a and the backup roll 72.

Figure 18:
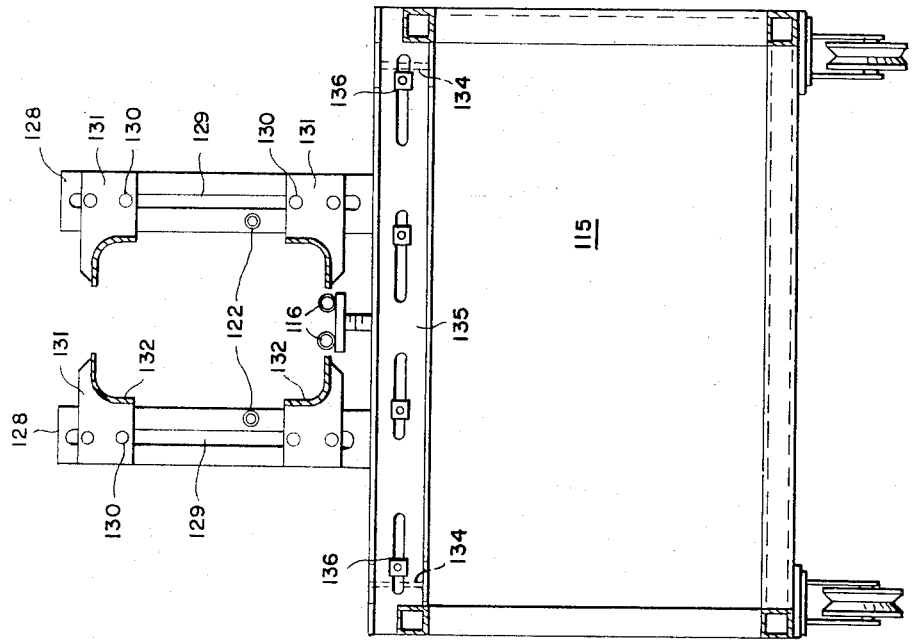
FIG. 18 is the delivery end elevation.
Figure 16:
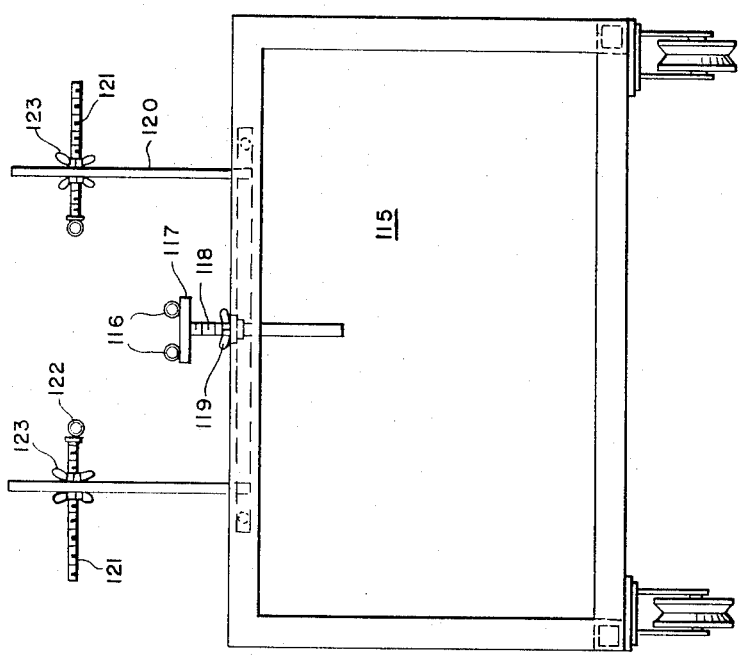
FIG. 16 is a feeding end elevation of the packaging unit.

A preferred form of stacking unit is illustrated in FIGS. 16 – 18. The unit comprises a base or support 115, the top wall of which carries a pair of centrally disposed, longitudinally extending rails 116, supported for vertical adjustment by cross-bars 117 mounted on threaded rods 118 which extend through the top wall of the base 115 and are adapted to be adjusted by a thumb screw or the like 119. A suitable number of these rail supports are provided in spaced relation along the top wall of the base to support the length of the rails 116.

On either side of the central rail assembly 116, the top wall of the base carries a series of longitudinally spaced uprights 120 which are transversely drilled to receive threaded rods 121, the opposite, inner ends of which carry side rails 122. These side rails are adjustable toward or away from one another by means of thumb screws 123. As will be seen from FIG. 13, the feeding end of the stacking unit 26 and its rails 116, 122 is located immediately adjacent the lower end of the chute 95 so as to receive the formed trays 22b which are presented to the rails on edge. By adjusting the positions of the respective rails, any size trays can be accommodated.

A plunger 124, operated by a piston and cylinder device 125, pushes the stacked trays forwardly along the rails and, preferably, a suitable counting device 126 automatically controls the number of trays to be packaged.

At the opposite end of the rails just referred to, a bagging device, generally indicated at 127, is provided for completing the packaging operation. This device comprises two laterally spaced vertical standards 128 having vertical slots 129 for slidably receiving guide pins 130 projecting from four supporting arms 131. Suitably secured to the supporting arms and projecting forwardly therefrom are four, elongated, bag supporting members 132 which, as best seen in FIG. 18, are curved in cross-section to complement the profiles of the trays fed therebetween. These bag support members are properly spaced to fit within the open end of a plastic bag or the like 133 into which the trays are advanced from the rails 116 and 122.

In order to provide for the proper horizontal adjustment of the uprights 128, their lower ends are secured to separate, relatively short angle irons 134 which are slidably secured to a long angle iron 135 by slot and pin arrangements 136. Thus, the bagging device may be adjusted laterally by the slot and pin arrangements 136 and vertically by the supporting arms 131 which are slidably supported in the vertical slots 129.

While preferred embodiments of the invention have been shown and described, it will be apparent to those skilled in the art that changes can be made in these embodiments without departing from the principles and spirit of the invention, the scope of which is defined in the appended claims.

The invention claimed is:

1. A continuous method of manufacturing articles from a thermoplastic polymeric resin strip, comprising causing a foamable thermoplastic polymeric resin heated to a plastic state and mixed with a blowing agent under pressure to flow along radials of a laterally diverging die passageway to a die orifice, continuously extruding and feeding a thin, narrow strip of said resin from said die orifice at a feed rate at least of the order of 40 feet per minute and expanding said resin to form a foam with a low density of no more than about 3 pounds per cubic foot, continuously spreading the extrudate laterally as the extrudate is fed from said die orifice and while the extrudate is expanding, to prevent the formation of wrinkles, thereby to form an expanded extrudate strip of the order of 0.020 to 0.300 inch thick and a maximum of about 18 inches wide, and thermoforming a series of individual articles from the spread extrudate to a depth in orthogonal planes of at least of the order of three-eighths of an inch by utilization of the heat of extrusion as the extrudate is continuously fed from said die, said forming being accomplished close enough to said die, and said extrudate being fed rapidly enough to permit such forming.

2. A method in accordance with claim 1, wherein said forming is accomplished by a series of rotating vacuum molds.

3. A method in accordance with claim 2, further comprising continuously withdrawing said strip from the molds after forming, and successively cutting the formed articles from the strip along the bounding profiles of the articles while continuously advancing the strip and while maintaining tension in the strip between the forming and cutting thereof.

4. A method in accordance with claim 3, further comprising ejecting the cut articles.

5. A method in accordance with claim 4, further comprising stacking the ejected articles, and conducting the strip selvage to a granulator for re-use.

6. A method in accordance with claim 3, wherein the vacuum forming and cutting of successive articles are coordinated to ensure accuracy in the cut articles.

7. A method in accordance with claim 2, further comprising vacuum sealing the areas of said strip adjacent the boundaries of the mold cavities and thereafter evacuating the mold cavities.

8. A method in accordance with claim 1, including transversely crimping said srip at the junctions of successive formed articles as said strip advances, to provide flexibility between the articles in the succeeding steps of the method.

9. A method in accordance with claim 1, wherein the spreading is accomplished by stretching the extrudate over a mandrel while the extrudate is expanding.

10. A method in accordance with claim 1, wherein the spreading is accomplished by passing the extrudate over a mandrel spaced about 2 to 3 inches from said die, and wherein the forming commences about 6 inches from the mandrel along the length of the extrudate.

11. A method in accordance with claim 1, wherein said resin is extruded through a cylindrical die orifice which is curved in a plane parallel to the width of the extrudate.

12. A method in accordance with claim 1, wherein said blowing agent is volatile, and wherein said spreading and forming are accomplished while said blowing agent remains under sufficient pressure to provide plasticity for said extrudate.

* * * * *